(12) United States Patent
Hamzaoui et al.

(10) Patent No.: US 10,678,911 B2
(45) Date of Patent: Jun. 9, 2020

(54) INCREASING AVAILABILITY OF AN INDUSTRIAL CONTROL SYSTEM

(71) Applicant: International Business Machines Corporation, Armonk, NY (US)

(72) Inventors: Karim Hamzaoui, Yamato (JP); Shohei Hido, Yamato (JP); Shoko Suzuki, Yamato (JP); Sachiko Yoshihama, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 13/803,388

(22) Filed: Mar. 14, 2013

(65) Prior Publication Data

US 2013/0205393 A1    Aug. 8, 2013

Related U.S. Application Data

(63) Continuation of application No. 13/365,626, filed on Feb. 3, 2012, now abandoned.

(30) Foreign Application Priority Data

Feb. 4, 2011 (JP) ................. 2011-022539

(51) Int. Cl.
  *G05B 23/02* (2006.01)
  *G06F 21/55* (2013.01)
(52) U.S. Cl.
  CPC ........ *G06F 21/55* (2013.01); *G05B 23/0232* (2013.01)
(58) Field of Classification Search
  CPC ...................... G05D 23/1951; G05B 23/0232

USPC ........................................ 702/183
See application file for complete search history.

(56) References Cited

U.S. PATENT DOCUMENTS

| 4,325,251 A | | 4/1982 | Kanegae |
|---|---|---|---|
| 4,344,142 A | | 8/1982 | Diehr, II et al. |
| 4,476,561 A | * | 10/1984 | Baackmann ......... H04B 17/403 714/736 |
| 4,902,469 A | * | 2/1990 | Watson .................. G21C 17/00 376/216 |

(Continued)

FOREIGN PATENT DOCUMENTS

| EP | 1420317 A2 | 5/2004 |
|---|---|---|
| JP | 06348239 A | 12/1994 |

(Continued)

OTHER PUBLICATIONS

Evans, Robert, P., Process Control System Cyber Security Standards—an Overview, May 2006, 52nd International Instrumentation Symposium.*

(Continued)

*Primary Examiner* — Hyun D Park
(74) *Attorney, Agent, or Firm* — Francis Lammes; Stephen J. Walder, Jr.; Brian Welle

(57) ABSTRACT

A mechanism is provided to improve the availability of an ICS and an external system that uses data from the ICS by ensuring operation of the ICS and operation of the system even if an anomaly has occurred in a device in the ICS. The mechanism receives measured data from the plurality of devices, calculates prediction data by using the measured data and correlation information used for deriving prediction data for correlated devices, and provides the measured data and the prediction data.

12 Claims, 6 Drawing Sheets

(56) References Cited

U.S. PATENT DOCUMENTS

| | | | |
|---|---|---|---|
| 5,132,920 A * | 7/1992 | Bellows | G05B 23/0283 376/245 |
| 5,761,090 A * | 6/1998 | Gross | G05B 19/4184 706/45 |
| 7,539,845 B1 | 5/2009 | Wentzlaff et al. | |
| 7,636,915 B1 * | 12/2009 | DiVittorio | G05B 19/41835 700/90 |
| 2003/0191966 A1 | 10/2003 | Gleichauf | |
| 2005/0182581 A1 * | 8/2005 | Hashemian | G05B 23/0283 702/105 |
| 2006/0021029 A1 | 1/2006 | Brickell et al. | |
| 2006/0114832 A1 | 6/2006 | Hamilton et al. | |
| 2006/0236374 A1 | 10/2006 | Hartman | |
| 2008/0082284 A1 | 4/2008 | Carroll et al. | |
| 2008/0134178 A1 | 6/2008 | Fitzgerald et al. | |
| 2009/0002150 A1 | 1/2009 | Zilberstein et al. | |
| 2009/0083843 A1 | 3/2009 | Wilkinson, Jr. et al. | |
| 2009/0281675 A1 * | 11/2009 | Rasmussen | F03D 7/047 700/287 |
| 2010/0076575 A1 | 3/2010 | Vasko et al. | |
| 2011/0020122 A1 * | 1/2011 | Parthasarathy | F03D 80/50 416/61 |
| 2011/0145926 A1 | 6/2011 | Dalcher et al. | |
| 2011/0184575 A1 | 7/2011 | Kawamoto et al. | |
| 2011/0290893 A1 * | 12/2011 | Steinberg | F24F 11/0034 236/49.3 |
| 2012/0203508 A1 | 8/2012 | Hamzaoui et al. | |
| 2012/0209411 A1 | 8/2012 | Ohkado et al. | |
| 2012/0210158 A1 | 8/2012 | Akiyama et al. | |

FOREIGN PATENT DOCUMENTS

| | | | |
|---|---|---|---|
| JP | 08077119 A | 3/1996 | |
| JP | 9069083 A | 3/1997 | |
| JP | 09-237240 | 9/1997 | |
| JP | 10501354 A | 2/1998 | |
| JP | 2000047987 A | 2/2000 | |
| JP | 2000508104 A | 6/2000 | |
| JP | 2001-243587 A | 9/2001 | |
| JP | 2002007234 A | 1/2002 | |
| JP | 2002-509669 | 3/2002 | |
| JP | 2002-510415 | 4/2002 | |
| JP | 2002111727 A | 4/2002 | |
| JP | 2002-149614 A | 5/2002 | |
| JP | 2003036243 A | 2/2003 | |
| JP | 2003114294 A | 4/2003 | |
| JP | 2004-118866 A | 4/2004 | |
| JP | 2004518193 A | 6/2004 | |
| JP | 2004234401 A | 8/2004 | |
| JP | 2004-302538 A | 10/2004 | |
| JP | 2005063054 A | 3/2005 | |
| JP | 3701688 B2 | 5/2005 | |
| JP | 2005-250802 A | 9/2005 | |
| JP | 2005-277655 A | 10/2005 | |
| JP | 2006-033140 A | 2/2006 | |
| JP | 2006-049909 A | 2/2006 | |
| JP | 2006178936 A | 7/2006 | |
| JP | 2006252256 A | 9/2006 | |
| JP | 2007-096735 A | 4/2007 | |
| JP | 2007-526452 A | 9/2007 | |
| JP | 2007-274027 A | 10/2007 | |
| JP | 2008-015722 A | 1/2008 | |
| JP | 2008500653 A | 1/2008 | |
| JP | 2008097164 A | 4/2008 | |
| JP | 2008527471 A | 7/2008 | |
| JP | 2008537267 A | 9/2008 | |
| JP | 2008-243195 A | 10/2008 | |
| JP | 2009-015861 | 1/2009 | |
| JP | 2009009557 A | 1/2009 | |
| JP | 2009-037545 A | 2/2009 | |
| JP | 2009-529187 A | 8/2009 | |
| JP | 2009-245029 A | 10/2009 | |
| JP | 4521456 B2 | 8/2010 | |
| JP | 4567106 B2 | 10/2010 | |
| JP | 2010267119 A | 11/2010 | |

OTHER PUBLICATIONS

U.S. Appl. No. 13/365,533.
U.S. Appl. No. 13/365,594.
U.S. Appl. No. 13/365,626.
U.S. Appl. No. 13/765,142.
U.S. Appl. No. 13/766,338.
Dzung, Dacfey et al., "Security for Industrial Communication Systems", Proceedings of the IEEE, vol. 93, No. 6, Jun. 2005, pp. 1152-1177.
Falco, Joe et al., "IT Security for Industrial Control Systems", http://citeseerx.ist.psu.edu/viewdoc/download?doi=10.1.1.13.9422&rep=rep1&type=pdf, date unknown, 16 pages.
Stouffer, Keith et al., "Guide to Industrial Control (ICS) Security", National Institute of Standards and Technology Special Publication 800-82 (Final Public Draft) Natl. Inst. Stand. Technol. Spec. Publ. 800-82, (Sep. 2008), 156 pages.
Notice of Allowance dated Jan. 2, 2014 for U.S. Appl. No. 13/365,594, 13 pages.
"*Alice Corporation PTY. LTD.* v. *CLA Bank International et al.*", Supreme Court of the United States, *Alice* vs *CLS Bank*, http://www.supremecourt.gov/opinions/13pdf/13-298_7lh8.pdf, October Term, 2013, Decided Jun. 19, 2014, 21 pages.

* cited by examiner

510

| 511 | 512 | 513 | 514 | 515 |
|---|---|---|---|---|
| DATE AND TIME | PRESSURE SENSOR 242 | TEMPERATURE SENSOR 244 | HUMIDITY SENSOR 246 | MOTION SENSOR 248 |
| 2011/1/11 10:10 | 990hPa | 28.2°C | 60% | 1 |
| 2011/1/11 10:20 | 973hPa | 27.4°C | 62% | 1 |
| 2011/1/11 10:30 | 978hPa | 27.2°C | 61% | 1 |
| ⋮ | ⋮ | ⋮ | ⋮ | ⋮ |

| 521 | 522 | 523 | 524 |
|---|---|---|---|
| DATE AND TIME | PRESSURE SENSOR 242 | TEMPERATURE SENSOR 244 | HUMIDITY SENSOR 246 |
| 2011/1/11 10:10 | 980hPa | 28.1°C | 61% |
| 2011/1/11 10:20 | 982hPa | 27.6°C | 62% |
| 2011/1/11 10:30 | 975hPa | 27.4°C | 58% |
| ⋮ | ⋮ | ⋮ | ⋮ |

INCREASING AVAILABILITY OF AN INDUSTRIAL CONTROL SYSTEM

BACKGROUND

The present invention relates to an industrial control system and, in particular, to a control system, method and program that increase availability of an industrial control system (hereinafter abbreviated as "ICS").

ICSs are being used as control systems such as water supply management systems, nuclear power plant control systems and traffic monitoring/control systems, and are playing an important role in supporting social infrastructure such as water and electricity supplies and transportation. The social infrastructure using the ICSs has a great influence on people's lives. Accordingly, a much greater availability is required of the ICSs than is required of ordinary IT systems.

In the past, ICSs were isolated from external networks such as the Internet and other ICSs. However, in recent years, ICSs have been connected onto an external network so that multiple external systems use information from devices managed by the ICSs. Consequently, the ICSs have become vulnerable to attacks, such as malware attacks, through the external networks and there has been a growing demand for more enhanced availability of ICSs.

One example of an ICS is a computing system disclosed in Patent Literature 1, which determines estimated average speed information of a vehicle traveling on a road on the basis of data samples reflecting the travel on the road. In the computing system, multiple sensors are embedded in the road and traffic data samples are obtained from these sensors to determine the average speed of the vehicle.

PATENT LITERATURE

National Publication of International Patent Application No. 2009-529187

SUMMARY

The computing system described in National Publication of International Patent Application No. 2009-529187 obtains data samples from the multiple sensors disposed close to each other for obtaining data of the same type in order to ensure fault tolerance through the complementary use of the data samples. However, if a network failure is caused by a network attack as described above or other events, data samples can be obtained from none of the sensors connected onto the network and data samples cannot be corrected.

Furthermore, if another, external system is using data samples from the computing system disclosed in National Publication of International Patent Application No. 2009-529187, the availability of the external system can be impaired by the vulnerability of the computing system.

The present invention solves the problems and an object of the present invention is to provide a control system, method and program that ensure operation of an industrial control system (ICS) and an external system that uses data from the ICS if an anomaly occurs on the devices or the networks included in the ICS, thereby improving the availability of the ICS and the system.

According to the present invention, there is provided a control system for processing data from a plurality of devices connected onto a network. The control system receives measured data from the plurality of devices, calculates prediction data by using the measured data and correlation information used for deriving prediction data for correlated devices, and provides the measured data and the prediction data. According to the present invention, the availability of the control system or the external system that uses the control system can be improved because data measured from correlated devices can be used to calculate prediction data for the devices which data cannot be correctly retrieved due to an anomaly of the devices, network or the control system.

Furthermore, according to the present invention, the installation costs of sensors can be reduced and the robustness against network attacks such as malware attacks can be improved because correlated sensors of different types are connected onto separate individual networks in the ICS, and measured data from the sensors of different types are used to calculate prediction data, and sensors of the same type do not need to be redundantly installed.

The present invention can provide a method and program that calculate and provide prediction data for correlated devices connected onto individual networks in the ICS to improve the availability of an ICS.

BRIEF DESCRIPTION OF THE SEVERAL VIEWS OF THE DRAWINGS

Embodiments of the present invention will now be described by way of example with reference to the accompanying drawings in which like references denote similar elements, and in which:

FIG. 5 is a diagram illustrating one embodiment of a data table storing measured data and prediction data in the present embodiment.

DETAILED DESCRIPTION

The present invention will be described with respect to embodiments thereof. However, the present invention is not limited to the embodiments described below.

Figure 1:
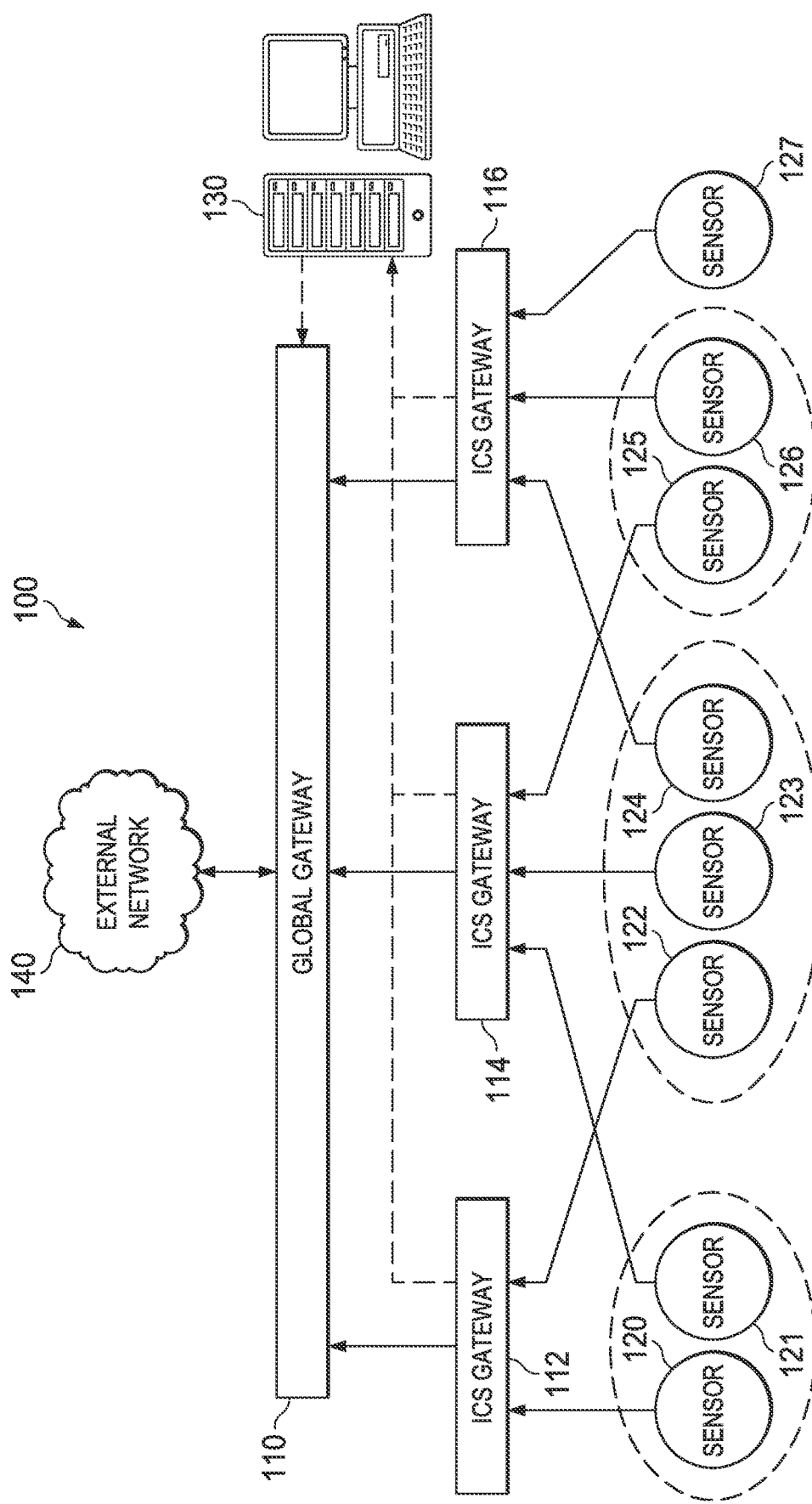
FIG. 1 is a diagram illustrating a control system according to an embodiment.

FIG. 1 is a diagram illustrating a control system 100 of an embodiment. The control system 100 is connected to an industrial control system (ICS) that includes a global gateway 110, ICS gateways 112, 114 and 116, and sensors 120, 121, 122, 123, 124 125, 126 and 127 connected to the ICS gateways, and an analysis server 130. In the control system of the present embodiment, data communication is performed among the devices in the control system 100 through the use of the system's own protocol. In another embodiment, data communication in the control system 100 may be performed through the use of a generally used protocol.

The global gateway 110 is a communication device provided in an upper network layer above the network layer formed by the ICS gateways 112, 114 and 116. The global gateway 110 provides data communication between the analysis server 130 and external systems and external devices connected onto an external network 140 such as the Internet or a WAN (Wide Area Network).

The ICS gateways 112, 114 and 116 are communication devices that obtain data actually measured by the sensors 120 to 127 connected to the ICS gateways (hereinafter the data will be referred to as "measured data") from the sensors and provide the measured data to the analysis server 130. The ICS gateways 112, 114 and 116 form individual networks with the sensors connected.

The sensors 120 to 127 sense various conditions, substances, and phenomena such as humidity, temperature, light intensity, radiation, water, the speed of an object, electric current and voltage and may be any of various sensors such as temperature, motion, humidity, radiation, water, speed, electric current, voltage, and light intensity sensors. In the control system 100, different types of sensors in a certain correlation such as being located physically in a close distance from each other (for example the sensors 120 and 121, the sensors 122 to 124, and the sensors 125 and 126) are connected onto different ICS gateway networks. The sensors 120 to 127 provide their measured data to the analysis server 130 through their respective ICS gateways 112, 114 and 116.

The analysis server 130 is an information processing apparatus that collects measured data from the sensors in the control system 100, generates data for a sensor predicted from the measured data from another sensor (hereinafter referred to as "prediction data") among correlated sensors, and provide the data. The analysis server 130 checks whether an anomaly has occurred in the control system 100 and provides the result of the check. Furthermore, when the analysis server 130 receives a request to send measured data and prediction data from a gateway in the control system 100, the analysis server 130 determines whether or not the sender of the request has the authority to obtain the data, and provides the data to the sender of the request that has the authority to obtain the data.

The analysis server 130 executes a program of the present invention written in a program language, such as an assembler language, C, C++, Java (registered trademark), JavaScript (registered trademark), PERL, PHP, RUBY, or PYTHON, under the control of an OS such as a Windows-series program such as Windows (registered trademark) 7, Windows Vista (registered trademark), Windows XP (registered trademark) and Windows 200X Server (registered trademark), or Mac OS (registered trademark), UNIX (registered trademark), LINUX (registered trademark), or Google Chrome OS.

The analysis server 130 includes a RAM providing an execution space for executing the program of the present invention and a hard disk drive (HDD) for persistently holding programs and data. By executing the program of the present invention, functions of the present embodiment, which will be described later, are implemented on the analysis server 130. The functional units of the present embodiment can be implemented by a machine-executable program written in any of the program languages enumerated above. The program of the present invention can be stored and distributed on a machine-readable recording medium such as an HDD, CD-ROM, MO, flexible disk, EEPROM, or EPROM and can be transmitted in a format readable to other devices through a network.

While the embodiment illustrated in FIG. 1 is a control system which is applied to a single ICS system, the present invention can be configured as an external system that uses data from a plurality of ICS systems in alternative embodiment.

Figure 2:
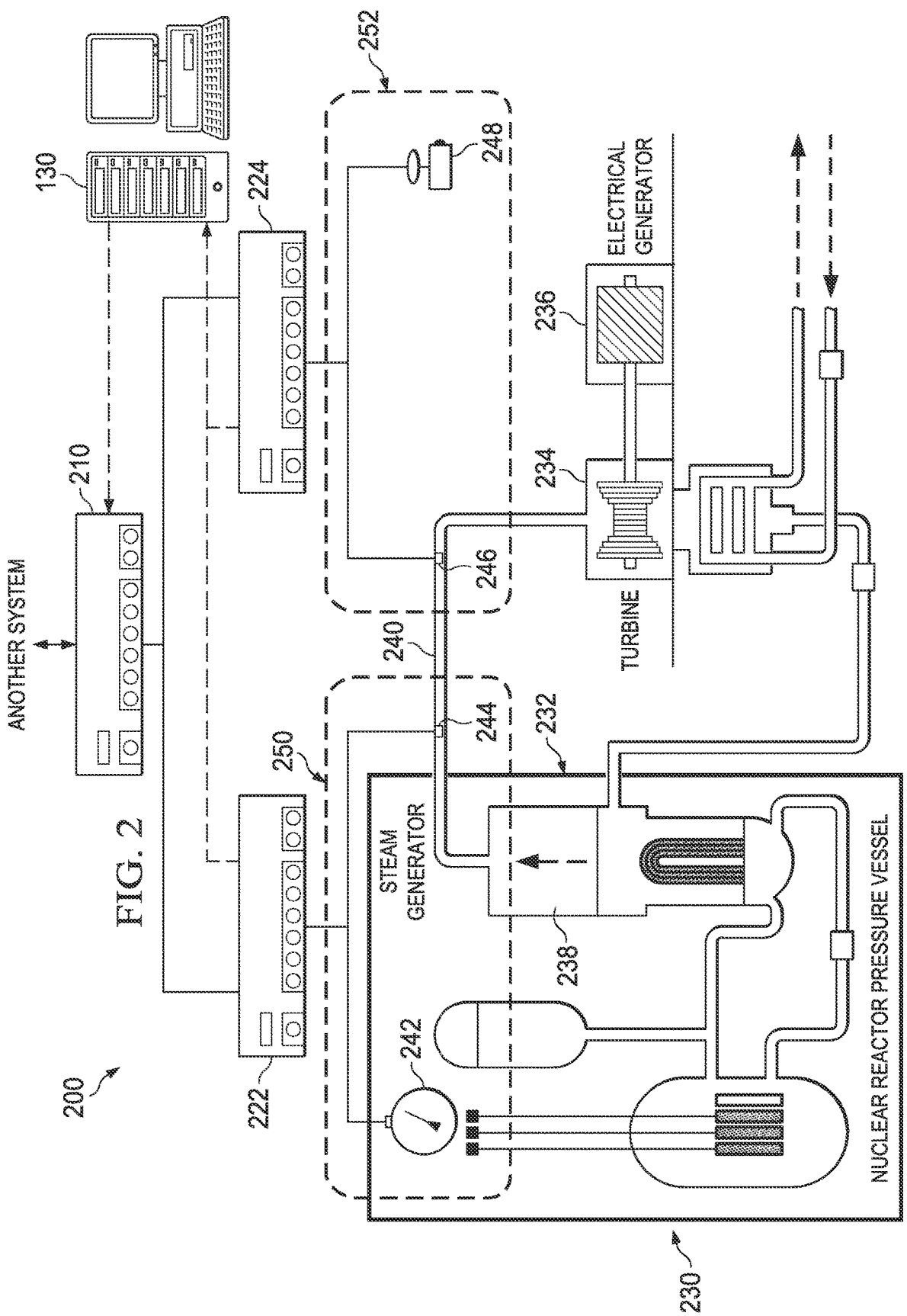
FIG. 2 is a diagram illustrating an embodiment in which the control system of the present invention is applied to a nuclear power plant control system.

FIG. 2 illustrates an embodiment in which the control system of the present invention is applied to a nuclear power plant control system. While the present invention will be described with the embodiment of the nuclear power plant control system, the present invention is not limited to this embodiment; the present invention can be applied to other ICSs such as water supply management systems and traffic monitoring/control systems.

The control system 200 illustrated in FIG. 2 includes an analysis server 130, a global gateway 210, ICS gateways 222 and 224, and a nuclear power system 230. The nuclear power system 230 includes a nuclear reactor vessel 232, a turbine 234, and an electrical generator 236. Various types of sensors 242, 244, 246 and 248 are provided in the nuclear power system 230.

A pressure sensor 242 for measuring the pressure in the nuclear reactor vessel 232 is provided in the nuclear reactor vessel 232. A temperature sensor 244 and a humidity sensor 246 for measuring the temperature and humidity in an outlet pipe 240 are provided in the outlet pipe 240 of a steam generator 238 in the nuclear reactor vessel 232. A motion sensor 248 that detects a human entering the nuclear power system 230 is provided near the electrical generator 236.

The pressure sensor 242 and the temperature sensor 244 are connected to the ICS gateway 222 and the humidity sensor 246 and the motion sensor 248 are connected to the ICS gateway 224. In the present embodiment, the temperature sensor 244 and the humidity sensor 246 measure the temperature and humidity, respectively, in the outlet pipe 240 that depend on the same steam fed into the outlet pipe 240 and accordingly these sensors are strongly correlated with each other. Therefore, the temperature sensor 244 and the humidity sensor 246 are connected to the networks 250 and 252, respectively, formed by the different ICS gateways 222 and 224, respectively.

In the embodiment illustrated in FIG. 2, the sensors send their measured data to the analysis server 130 through the ICS gateways 222 and 224 at regular intervals. When the ICS gateways 222 and 224 receive measured data from a sensor, the ICS gateways 222 and 224 add information that can uniquely identify the sensor (hereinafter referred to as "sensor identification information") to the measured data and sends the data to the analysis server 130. In the present embodiment, a combination of information that can uniquely identify the ICS gateway (hereinafter referred to as "ICS gateway identification information") and the port number of the ICS gateway to which a sensor is connected can be used as the sensor identification information. In an alternative embodiment, the sensors may send measured data in response to a request from the analysis server 130 and any sensor identification information may be used that can uniquely identify each sensor.

Figure 3:
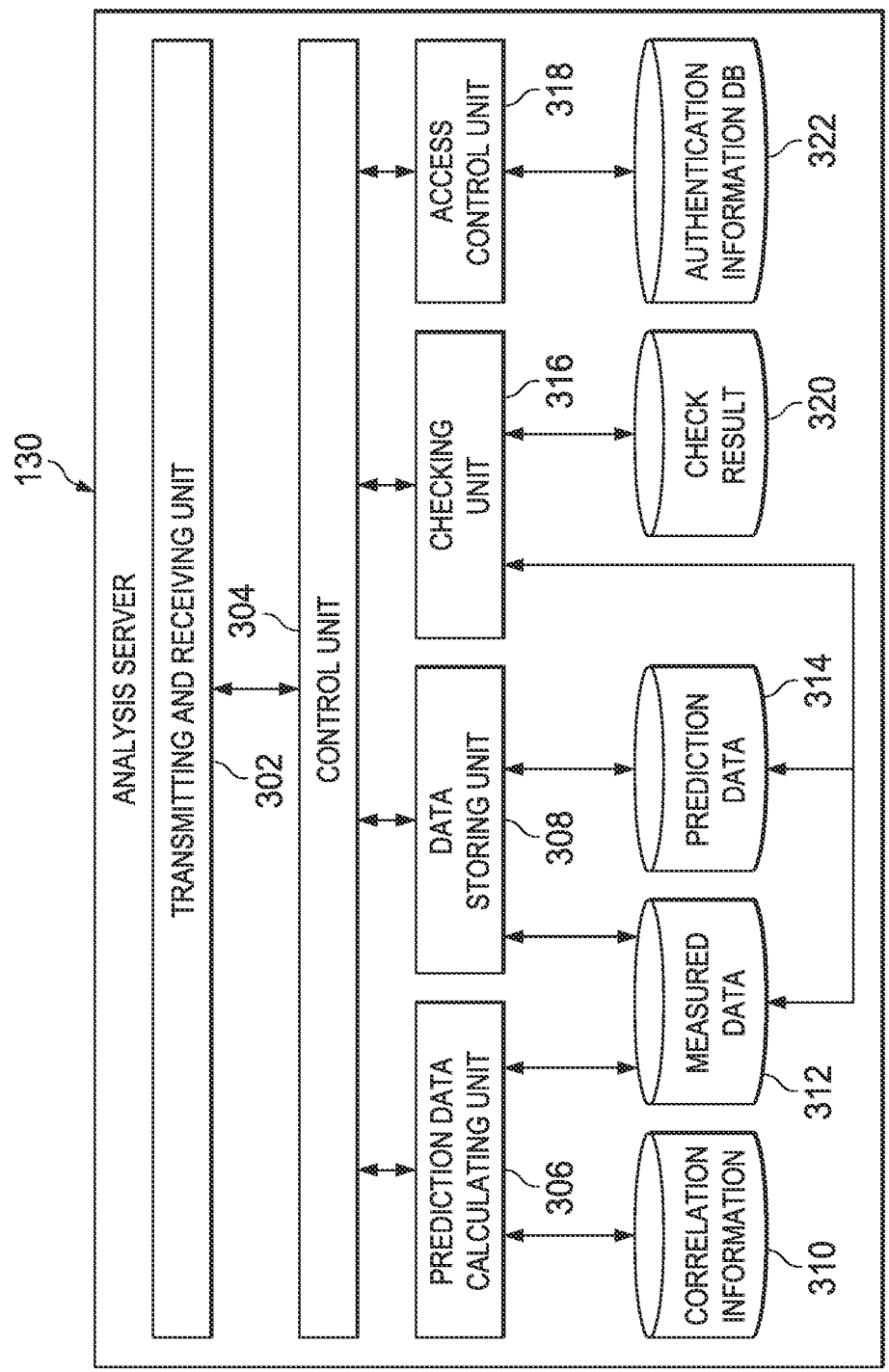
FIG. 3 is a diagram illustrating a functional configuration of an analysis server of the present embodiment.

FIG. 3 illustrates a functional configuration of the analysis server 130 of FIG. 2 of the present embodiment. The analysis server 130 includes a transmitting and receiving unit 302, a control unit 304, a prediction data calculating unit 306, a data storing unit 308, and storage devices 310, 312 and 314.

The transmitting and receiving unit 302 transmits and receives data between the analysis server 130 and the devices in the control system 200. The transmitting and receiving unit 302 receives a certain request and measured data measured by the sensors from the global gateway 210 and the ICS gateways 222 and 224. When the transmitting and receiving unit 302 receives the request, the transmitting and receiving unit 302 notifies the control unit 304 of the reception of the request. The transmitting and receiving unit 302 sends and provides measured data, prediction data and the result of check, which will be described later, to a requesting device such as the global gateway 210. The transmitting and receiving unit 302 performs data communication with the global gateway 210 and the ICS gateways 222 and 224 according to a communication protocol used within the control system 200.

The control unit 304 controls the entire analysis server 130. The control unit 304 calls functional units, which will be described later, to perform various kinds of processing as appropriate according to the types of requests received from the transmitting and receiving unit 302.

Specifically, when the control unit 304 receives a request to record measured data from a sensor in the control system 200, the control unit 304 calls the data storing unit 308 to cause the data storing unit 308 to store the measured data in the storage device 312. The control unit 304 calls the prediction data calculating unit 306 to cause the prediction data calculating unit 306 to calculate prediction data corresponding to the measured data and calls the checking unit 316 to cause the checking unit 316 to check whether an abnormal condition has occurred in the control system 200.

When the control unit 304 receives a request to send measured data and prediction data, the control unit 304 calls an access control unit 318 to cause the access control unit 318 to determine whether or not the requester has the authority to obtain the data.

The prediction data calculating unit 306 uses measured data stored in the storage device 312 and correlation information stored in the storage device 310 to calculate prediction data. The correlation information is information used for calculating prediction data for correlated sensors and may be a formula for calculating prediction data for each sensor. The predication data calculation formula is a formula such as a multiple regression model or a VAR (Vector Auto Regression) model derived by multivariate recurrence analysis such as multiple regression analysis or VAR on the basis of past sensor data from the sensors of the control system that are operating properly. In the present embodiment, the prediction data formula can use an objective variable such as (1) measured data from a correlated sensor, (2) prediction data for a correlated sensor, and (3) one or more previous pieces of measured data from a sensor for which prediction data are to be calculated.

The correlation information stored in the storage device 310 can be updated with time as the control system is operated. The accuracy of prediction data can be improved with time by using more up-to-date correlation information.

The data storing unit 308 stores measured data and prediction data of the sensors in the control system 200 in the storage devices 312 and 314 along with the time at which the measured data and prediction data were obtained or stored. The measured data and prediction data will be described later in detail with reference to FIGS. 5 and 6.

The analysis server 130 includes the checking unit 316, the access control unit 318, the storage device 320 and an authentication information database 322.

The checking unit 316 checks whether an anomaly has occurred in the control system 200. The checking unit 316 uses measured data received from sensors, prediction data calculated by the prediction data calculating unit 306 and an error event to check whether a failure has occurred in a device or on a network in the control system 200.

Specifically, when the checking unit 316 has not received measured data that it should have received from a sensor at regular intervals, the checking unit 316 can determine that a failure has occurred in the sensor that should have generated or sent the measured data not received, or a network device such as a network cable or an ICS gateway that is connected to the sensor.

In this case, the checking unit 316 stores setting information in which sensor identification information of senders from which measured data are received at regular intervals is written in a storage device in advance and compares sensor identification information added to measured data actually received with the sensor identification information contained in the setting information. If measured data having the sensor identification information contained in the setting information have not been received, the checking unit 316 can determine that a failure has occurred in the sensor identified by the sensor identification information or a network device connected to the sensor. Alternatively, if a failure has occurred in a sensor, the sensor or the ICS gateway may issue an error event and the checking unit 316 may detect the occurrence of the failure through the error event.

Furthermore, if measured data have not been received from multiple sensors that are connected to the same ICS gateway, the checking unit 316 can determine that a failure has occurred in the ICS gateway or a network device such as a cable. In this case, the checking unit 316 compares sensor identification information contained in the setting information described above with sensor identification information added to actually receive measured data. If multiple pieces of measured data have not been received and the checking unit 316 determines, from the ICS gateway information contained in the sensor identification information, that the measured data not received should have been sent from the same ICS gateway, the checking unit 316 can determine that a failure has occurred in the ICS gateway or a network device such as a cable. Alternatively, if a failure has occurred in a network device, the ICS gateway may issue an error event and the checking unit 316 may detect the occurrence of the failure through the error event.

Furthermore, if a measured data sample received from a sensor is abnormal, the checking unit 316 can determine that a failure has occurred in the sensor. In this case, the identification information of each sensor is associated with an acceptable range of its measured data and is stored in a storage device as setting information in advance. The checking unit 316 can refer to the setting information and determine whether measured data received from a sensor are in the acceptable range associated with the sensor identification information added to the measured data to determine whether or not the measured data are abnormal. Alternatively, the checking unit 316 can compare measured data received from a sensor with prediction data calculated by the prediction data calculating unit 306 that corresponds to the measured data and, if the difference between the data is beyond a predetermined acceptable range, the checking unit 316 can determine that the measured data are abnormal.

The checking unit 316 stores the check result indicating which measured data are abnormal in the storage device 320. In the present embodiment, the sensor identification information of the sensor from which the measured data found to be abnormal was received and the date and time of the measured data are used as the result of check. The result of check is provided to a device such as the ICS global gateway that has requested the measured data and prediction data along with the measured data and the prediction data. The requesting device can refer to the result of check to determine which of measure data are abnormal and can selectively use either the measured data or the prediction data according to its policy.

While the checking unit 316 is configured as functional means in the analysis server 130 in the present embodiment, a control system including a checking server that is an information processing apparatus having the checking function may be configured in other embodiments, instead of providing the functional means in the analysis server 130.

In this case, the checking server can obtain measured data and prediction data from the analysis server or can obtain measured data from an ICS gateway and obtain prediction data from the analysis server, and can use the measured data and the prediction data as well as the setting information described above to determine whether or not an anomaly has occurred in the control system 200. Alternatively, when a failure occurs in a sensor or a network device, the sensor or ICS gateway may issue an error event and the checking server may detect the occurrence of failure as described above. Alternatively, if the analysis server has not received measured data that it should have, the analysis server may notify the checking server of that fact and the checking server may detect the occurrence of failure through the notification. The checking server provides the result of the check to the analysis server 130.

The access control unit 318 determines whether or not the sender of a request to send measured data and prediction data has the authority to obtain the data. In the present embodiment, the ICS global gateway and the ICS gateways in the control system 200 may request measured data and prediction data. These devices send their own identification information, that is, global gateway identification information and ICS gateway identification information, along with the requests.

The access control unit 318 can refer to the authentication information database 322 in which the ICS global gateway identification information, the ICS gateway identification information and information indicating whether the ICS global gateway or the ICS gateways identified by the identification information have the authority to obtain data to determine whether the requesting device has the authority to obtain the measured data and the prediction data.

While correlation information, measured data, prediction data, the result of check, and the authentication information database are stored in the storage devices in the analysis server 130 in the embodiment illustrated in FIG. 3, these items of information may be stored on an external storage device accessible to the analysis server 130 in an alternative embodiment.

Figure 4:
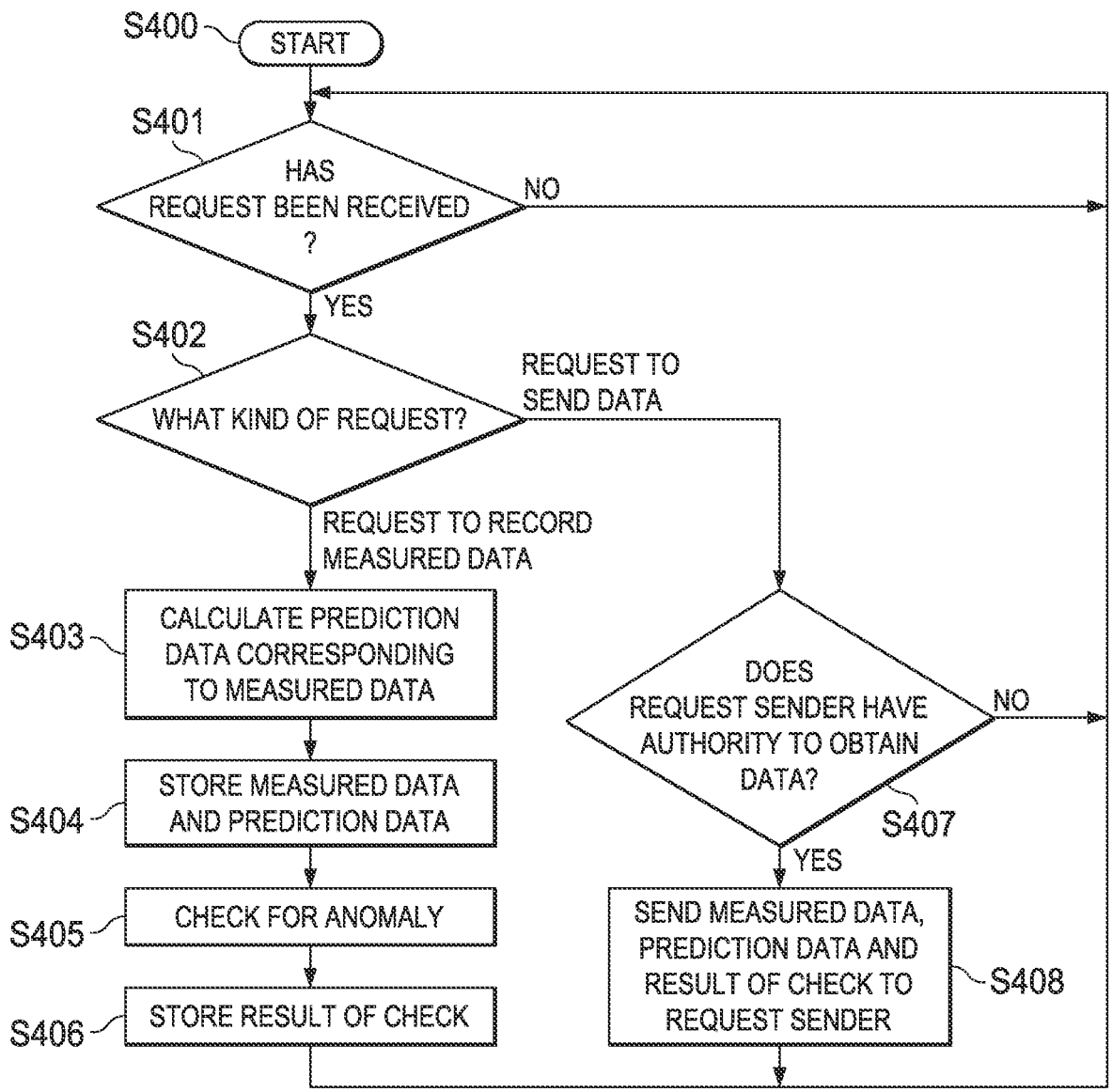
FIG. 4 is a flowchart illustrating an embodiment of a process performed by the analysis server of the present embodiment.

FIG. 4 is a flowchart illustrating an embodiment of a process performed at the analysis server of the present embodiment. The process performed at the analysis server 130 will be described below with reference to FIG. 4.

The process in FIG. 4 starts with step S400. At step S401, the control unit 304 of the analysis server 130 determines whether it has received a request from a device in the control system 200. If not, (no), step S401 is repeated to wait for a request. On the other hand, if the control unit 304 determines that it has received a request (yes), the process proceeds to step S402.

At step S402, the control unit 304 determines the type of the request received. If the control unit 304 determines that the request is a request to record measured data, the process proceeds to step S403. The control unit 304 calls the prediction data calculating unit 306, which then uses correlation information stored in the storage device 310 and measured data received along with the record request to calculate prediction data corresponding to the measured data. At step S404, the control unit 304 calls the data storing unit 308, which then stores the received measured data and the prediction data calculated by the prediction data calculating unit 306 in the storage devices 312 and 314.

At step S405, the control unit 304 calls the checking unit 316, which then checks whether an anomaly has occurred in the control system 200. At step S406, the checking unit 316 stores the result of the check in the storage device 320 and then the process returns to step S401.

On the other hand, if it is determined at step S402 that the type of the received request is a request to send measured data and prediction data, the process proceeds to step S407. At step S407, the control unit 304 calls the access control unit 318, which then determines whether or not the sender of the request has the authority to obtain the data. If the sender does not have the authority (no), then the process returns to step S401. On the other hand, if the sender of the request has the authority (yes), the process proceeds to step S408. At step S408, the control unit 304 obtains the measured data, the prediction data and the result of the check from the storage devices 312, 314 and 320 and sends these items of data to the sender of the request. Then the process returns to step S401.

While the control unit 304 in the present embodiment sends measured data and prediction data to the request sender without merging these items of data, the control unit 304 may replace measured data that cannot be obtained or the prediction data which are abnormal with corresponding prediction data and merge the data and may send the merged data. In this case, the requesting device can refer to the result of check received along with the merged data to determine which measured data have been replaced with prediction data.

While prediction data are calculated when a request to record measured data is received in the present embodiment, the analysis server 130 may calculate prediction data when the checking unit 316 or checking server detects an anomaly in a sensor or a network device through reception of an error event as described above or by not having received measured data. In this case, the analysis server 130 sends the result of the detection to the sender of the request along with the measured data and the prediction data.

Figure 6:
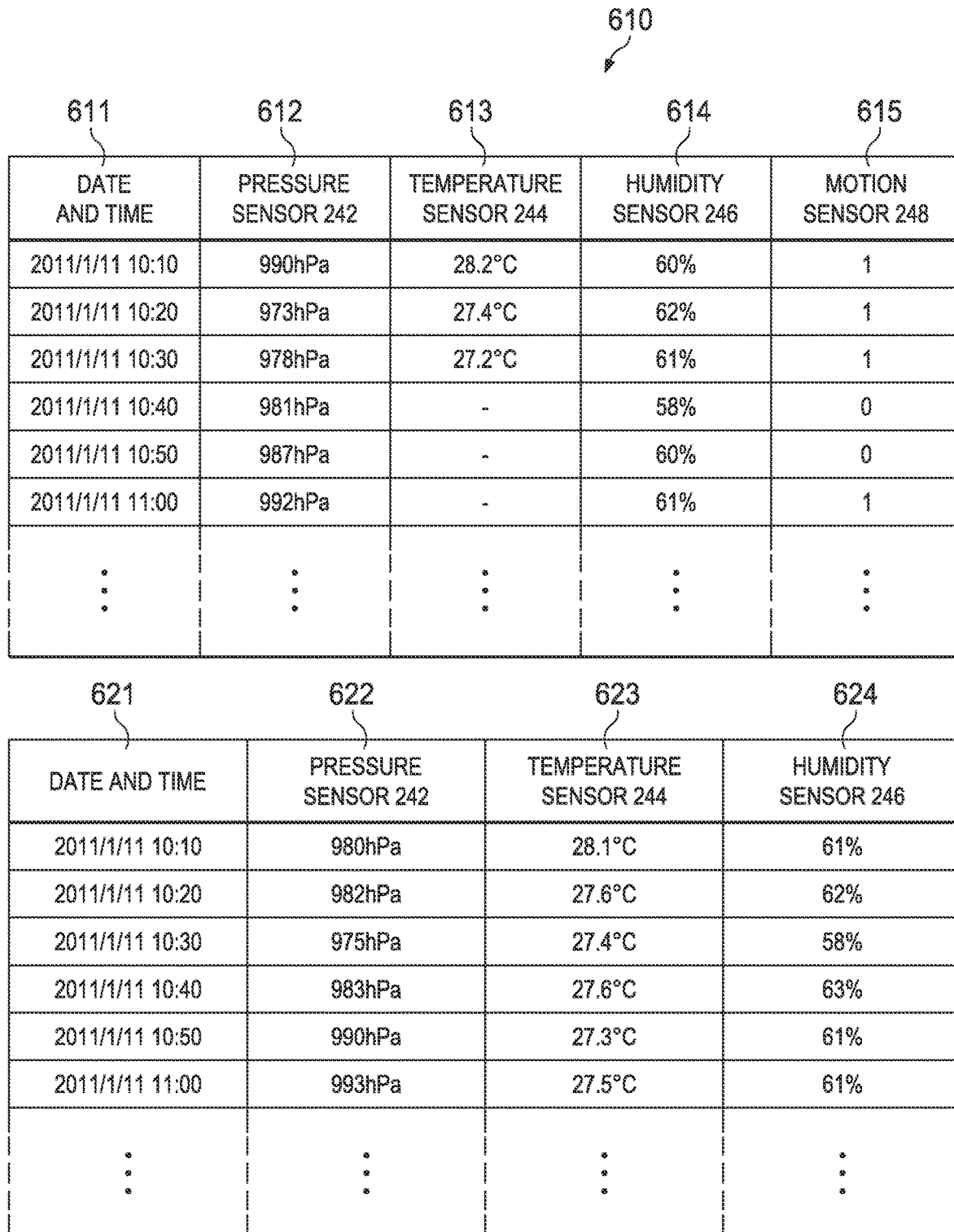
FIG. 6 is a diagram illustrating one embodiment of the data table storing measured data and prediction data in the present embodiment.

FIGS. 5 and 6 show embodiments of data tables in which measured data and prediction data of the present embodiment are stored. Data tables 510, 520, 610 and 620 will be described below with reference to FIGS. 5 and 6.

The data table 510 is a data table in which measured data from the sensors of the control system 200 are stored. The data table 510 is built in a storage device accessible to the analysis server 130. The date and time on which measured data were obtained or stored is recorded in a date and time data field 511 of the data table 510. Measured data from the pressure sensor 242, the temperature sensor 244, the humidity sensor 246 and the motion sensor 248 are recorded for each date and time in data fields 512, 513, 514 and 515 for the sensors.

The data table 520 is a data table in which prediction data calculated by the analysis server 130 are stored. The data table 520 is built in a storage device accessible to the analysis server 130. As in the data table 510, the date and time on which prediction data were calculated or stored is recorded in the date and time data field 521 of the data table 520 and prediction data for the pressure sensor 242, the temperature sensor 244, and the humidity sensor 246 are recorded for each date and time in data fields 522, 523 and 524 for the sensors.

In the embodiment illustrated in FIG. 5, the temperature sensor 244 and the humidity sensor 246 are in a strong correlation and prediction data calculated using measured data from the correlated sensors are recorded in the data fields of these sensors. For example, prediction data (temperature "28.1° C.") for the temperature sensor 244 on the date and time "2011/1/11 10:10" can be calculated by using correlation information including, as an objective variable, a measured data sample (humidity "60%") that was measured by the humidity sensor 246 correlated with the temperature sensor 244 on that date and time. Similarly, a prediction data sample (humidity "61%") for the humidity sensor 246 on the date and time "2011/1/11 10:10" can be calculated by using correlation information including, as an objective variable, a measured data sample (humidity "28.2° C.") that was measured by the temperature sensor 244 on that date and time.

Furthermore, a prediction data sample (pressure "980 hPa") for the pressure sensor 242 on the date and time "2011/1/11 10:10" may be calculated by using correlation information including, as objective variables, measured data (temperature "28.2° C. and humidity "60%) measured by the temperature sensor 244 and the humidity sensor 246 on that date and time.

The data tables 610 and 620 shown in FIG. 6 are data tables resulting from recording additional measured data and prediction data in the data tables shown in FIG. 5.

In the data table 610, measured data of temperature sensor 244 from "2011/1/11 10:40" to "2011/1/11 11:00" are not recorded. This shows that an anomaly has occurred in the control system and measured data could not be obtained from the temperature sensor. In the data table 620, on the other hand, prediction data for the temperature sensor 244 calculated by using measured data measured by the humidity sensor 246 at those dates and times are recorded. Prediction data for the humidity sensor 246 at those dates and times can be calculated by using correlation information including prediction data for the temperature sensor 244 at those dates and times as objective variables, instead of correlation information including measured data of the temperature sensor 244 at those dates and times as objective variables.

While measured data and prediction data are stored in the form of a data table in the embodiment illustrated in FIGS. 5 and 6, the measured data and the prediction data may be written and stored in a log or a journal.

While the foregoing has described the present embodiments, it should be understood that the present invention is not limited to the embodiments described above. Changes such as modifications and omissions of functional means of the embodiments and addition of other functional means to the embodiments that will occur to those skilled in the art can be made within the scope of the present invention. Any embodiments that have the functions and effects of the present invention are included in the scope of the present invention.

DESCRIPTION OF SYMBOLS

100 . . . Control system
110 . . . Global gateway
112, 114, 116 . . . ICS gateway
120-127 . . . Sensor
130 . . . Analysis server
140 . . . External network
200 . . . Control system
210 . . . Global gateway
222, 224 . . . ICS gateway
230 . . . Nuclear power system
232 . . . Nuclear reactor vessel
234 . . . Turbine
236 . . . Electrical generator
238 . . . Steam generator
240 . . . Outlet pipe
242 . . . Pressure sensor
244 . . . Temperature sensor
246 . . . Humidity sensor
248 . . . Motion sensor
250, 252 . . . Network

The invention claimed is:

1. A method performed by an information processing apparatus processing data from a plurality of devices in a system in which at least two devices are correlated with each other among the plurality of devices, thereby forming at least two correlated devices, are connected to an individual network included in a nuclear power plant control system, the method comprising:

receiving, by a transmitting and receiving unit in the information processing apparatus, measured data from the at least two correlated devices, wherein each of the at least two correlated devices are proximate to each other and each measure one or more of conditions, substances, or phenomena for a particular portion of the nuclear power plant control system that causes the at least two correlated devices to be correlated using their proximity and measurements and wherein the at least two correlated devices are sensors selected from the group consisting of a temperature sensor, motion sensor, humidity sensor, radiation sensor, water sensor, electric current sensor, voltage sensor, and light intensity sensor, calculating, by a prediction data calculating unit in the information processing apparatus, prediction data by using the measured data and correlation information for deriving prediction data for the at least two correlated devices, wherein the correlation information is a regression formula selected from the group consisting of a multiple regression model or a Vector Auto Regression model that indicates the proximity of the at least two correlated devices to each other, wherein the prediction data uses data from a first sensor to predict data that is not obtainable from a second sensor, and wherein the first sensor is a different type of sensor from the second sensor;

referring, by an access control unit in the information processing apparatus, to an authorization information database to determine whether or not a requester of the measured data and the prediction data has the authority to obtain the measured data and the prediction data, the authentication information database indicting whether or not the requester of the measured data and the prediction data has an authority to obtain the measured data and the prediction data;

responsive to the requester has the authority, providing, by a control unit in the information processing apparatus, the measured data and the prediction data;

using the measured data and the prediction data, checking, by a checking unit in the information processing apparatus, whether an anomaly has occurred in the system indicative of a failure in one or more devices associated with the at least two correlated devices or a failure in the individual network that connects the at least two correlated devices; and responsive to the anomaly occurring indicative of the failure in one or more devices associated with the at least two correlated devices or the failure in the individual network that connects the at least two correlated devices, sending, by the transmitting and receiving unit in the information processing apparatus, an indication of the failure in one or more devices associated with the at least two correlated devices or the failure in the individual network that connects the at least two correlated devices for addressing the failure in the one or more devices associated with the at least two correlated devices or the failure in the individual network that connects the at least two correlated devices.

2. The method according to claim 1, wherein the correlation information is a prediction formula including an objective variable, the objective variable being measured data from one or more of the at least two correlated devices.

3. The method according to claim 1, wherein the correlation information is a prediction formula including an objective variable, the objective variable being past measured data from one or more of the at least two correlated devices for which prediction data are to be calculated.

4. The method according to claim 1, wherein the correlation information is a prediction formula including an objective variable, the objective variable being prediction data for one or more of the at least two correlated devices.

5. A nuclear power plant control system for processing data from a plurality of devices connected onto a network, the control system comprising:

at least two devices correlated with each other among the plurality of devices, thereby forming at least two correlated devices, are connected to an individual network included in the nuclear power plant control system; and an information processing apparatus for:

receiving, by a transmitting and receiving unit in the information processing apparatus, measured data from the at least two correlated devices, wherein each of the at least two correlated devices are proximate to each other and each measure one or more of conditions, substances, or phenomena for a particular portion of the nuclear power plant control system that causes the at least two correlated devices to be correlated using their proximity and measurements and wherein the at least two correlated devices are sensors selected from the group consisting of a temperature sensor, motion sensor, humidity sensor, radiation sensor, water sensor, electric current sensor, voltage sensor, and light intensity sensor, calculating, by a prediction data calculating unit in the information processing apparatus, prediction data by using the measured data and correlation information for deriving prediction data for the at least two correlated devices, wherein the correlation information is a regression formula selected from the group consisting of a multiple regression model or a Vector Auto Regression model that indicates the proximity of the at least two correlated devices to each other, wherein the prediction data uses data from a first sensor to predict data that is not obtainable from a second sensor, and wherein the first sensor is a different type of sensor from the second sensor, referring, by an access control unit in the information processing apparatus, to an authorization information database to determine whether or not a requester of the measured data and the prediction data has the authority to obtain the measured data and the prediction data, the authentication information database indicting whether or not the requester of the measured data and the prediction data has an authority to obtain the measured data and the prediction data;

responsive to the requester has the authority, providing, by a control unit in the information processing apparatus, the measured data and the prediction data;

using the measured data and the prediction data, checking, by a checking unit in the information processing apparatus, whether an anomaly has occurred in the system indicative of a failure in one or more devices associated with the at least two correlated devices or a failure in the individual network that connects the at least two correlated devices; and responsive to the anomaly occurring indicative of the failure in one or more devices associated with the at least two correlated devices or the failure in the individual network that connects the at least two correlated devices, sending, by the transmitting and receiving unit in the information processing apparatus, an indication of the failure in one or more devices associated with the at least two correlated devices or the failure in the individual network that connects the at least two correlated devices for addressing the failure in the one or more devices associated with the at least two correlated devices or the failure in the individual network that connects the at least two correlated devices.

6. The control system according to claim 5, wherein the correlation information is a prediction formula including an objective variable, the objective variable being measured data from one or more of the at least two correlated devices.

7. The control system according to claim 5, wherein the correlation information is a prediction formula including an objective variable, the objective variable being past measured data from one or more of the at least two correlated devices for which prediction data are to be calculated.

8. The control system according to claim 5, wherein the correlation information is a prediction formula including an objective variable, the objective variable being prediction data for one or more of the at least two correlated devices.

9. A non-transitory machine-readable recording medium storing a machine-executable program for causing an information processing apparatus processing data from a plurality of devices in a system in which at least two devices correlated with each other among the plurality of devices, thereby forming at least two correlated devices, are connected to an individual network included in a nuclear power plant control system therein, wherein the machine-executable program, when executed on a computing device, causes the computing device to:

receive, by a transmitting and receiving unit in the information processing apparatus, measured data from the at least two correlated devices, wherein each of the at least two correlated devices are proximate to each other and each measure one or more of conditions, substances, or phenomena for a particular portion of the nuclear power plant control system that causes the at least two correlated devices to be correlated using their proximity and measurements and wherein the at least two correlated devices are sensors selected from the group consisting of a temperature sensor, motion sensor, humidity sensor, radiation sensor, water sensor, electric current sensor, voltage sensor, and light intensity sensor, calculate, by a prediction data calculating unit in the information processing apparatus, prediction data by using the measured data and correlation information for deriving prediction data for the at least two correlated devices, wherein the correlation information is a regression formula selected from the group consisting of a multiple regression model or a Vector Auto Regression model that indicates the proximity of the at least two correlated devices to each other, wherein the prediction data uses data from a first sensor to predict data that is not obtainable from a second sensor, and wherein the first sensor is a different type of sensor from the second sensor;

refer, by an access control unit in the information processing apparatus, to an authorization information database to determine whether or not a requester of the measured data and the prediction data has the authority to obtain the measured data and the prediction data, the authentication information database indicting whether or not the requester of the measured data and the prediction data has an authority to obtain the measured data and the prediction data;

responsive to the requester has the authority, provide, by a control unit in the information processing apparatus, the measured data and the prediction data;

using the measured data and the prediction data, check, by a checking unit in the information processing apparatus, whether an anomaly has occurred in the system indicative of a failure in one or more devices associated with the at least two correlated devices or a failure in the individual network that connects the at least two correlated devices; and responsive to the anomaly occurring indicative of the failure in one or more devices associated with the at least two correlated devices or the failure in the individual network that connects the at least two correlated devices, send, by the transmitting and receiving unit in the information processing apparatus, an indication of the failure in one or more devices associated with the at least two correlated devices or the failure in the individual network that connects the at least two correlated devices for addressing the failure in the one or more devices associated with the at least two correlated devices or the failure in the individual network that connects the at least two correlated devices.

10. The non-transitory machine-readable recording medium according to claim 9, wherein the correlation information is a prediction formula including an objective variable, the objective variable being measured data from one or more of the at least two correlated devices.

11. The non-transitory machine-readable recording medium according to claim 9, wherein the correlation information is a prediction formula including an objective variable, the objective variable being past measured data from one or more of the at least two correlated devices for which prediction data are to be calculated.

12. The non-transitory machine-readable recording medium according to claim 9, wherein the correlation information is a prediction formula including an objective variable, the objective variable being prediction data for one or more of the at least two correlated devices.

* * * * *